United States Patent

Mercier

[15] 3,640,121
[45] Feb. 8, 1972

[54] SLUMP INDICATOR

[72] Inventor: Julian J. Mercier, 11302 East 4th Ave., Spokane, Wash. 99206

[22] Filed: Mar. 9, 1970

[21] Appl. No.: 17,687

[52] U.S. Cl. ................................................73/54, 73/433
[51] Int. Cl. ......................................G01n 9/02, G01n 33/38
[58] Field of Search ..............................73/54, 433, 435, 436

[56] References Cited

UNITED STATES PATENTS

| 1,898,890 | 2/1933 | Perry | 73/54 |
| 1,983,197 | 12/1934 | Stamp | 73/54 |
| 2,013,837 | 9/1935 | Perry | 73/54 X |
| 2,409,014 | 10/1946 | Bohmer et al. | 73/54 |
| 2,630,706 | 3/1953 | Maxon, Jr. | 73/54 |

Primary Examiner—Louis R. Prince
Assistant Examiner—Joseph W. Roskos
Attorney—John W. Kraft

[57] ABSTRACT

A liquid filled vial pivotally and resiliently mounted is operable to unlock the dial mechanism of the invention in one and only one position as the slump indicator is rotationally carried in a mixing drum and to maintain the indicator in a fixed position and thus maintain the reading throughout the rotational cycle of the drum. Deflector walls are provided on two opposing sides of a sample cage hingedly carried by a strain gauge indicator assembly. The strain gauge indicator assembly comprises a tension plate mounted on a spring and slidably carried in a multiplicity of yokes on a mounting base, a normally locked indicator, a shaft suitably fixed at one of its terminal ends to the tension plate and having a sample cage hingedly carried at the opposite end thereof.

3 Claims, 14 Drawing Figures

PATENTED FEB 8 1972

3,640,121

JULIAN J. MERCIER  INVENTOR.

BY *John W. Kraft*

PATENTED FEB 8 1972

JULIAN J. MERCIER  INVENTOR.

BY John W. Kraft

JULIAN J. MERCIER INVENTOR.

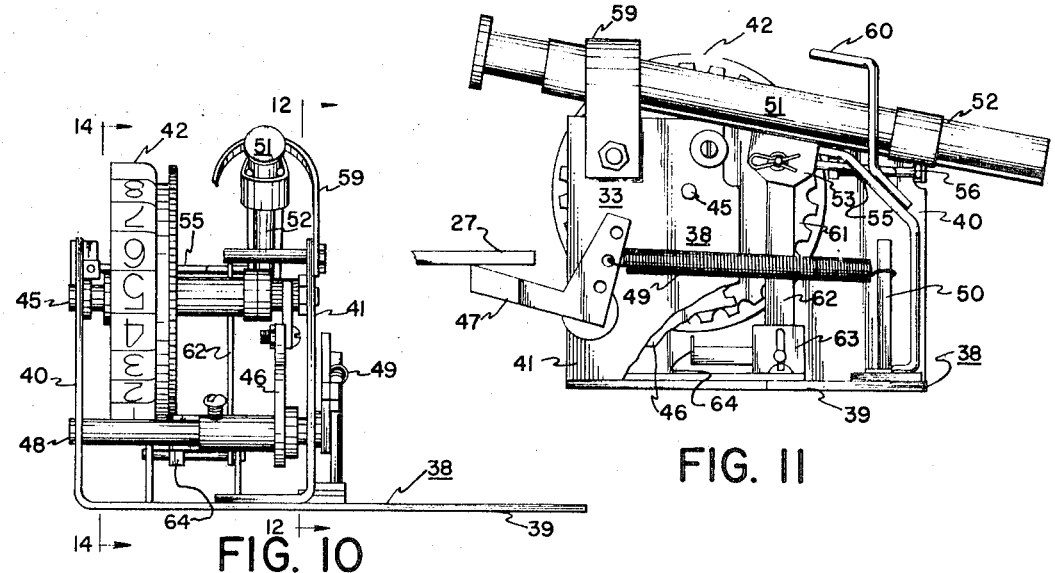
FIG. 10
FIG. 11
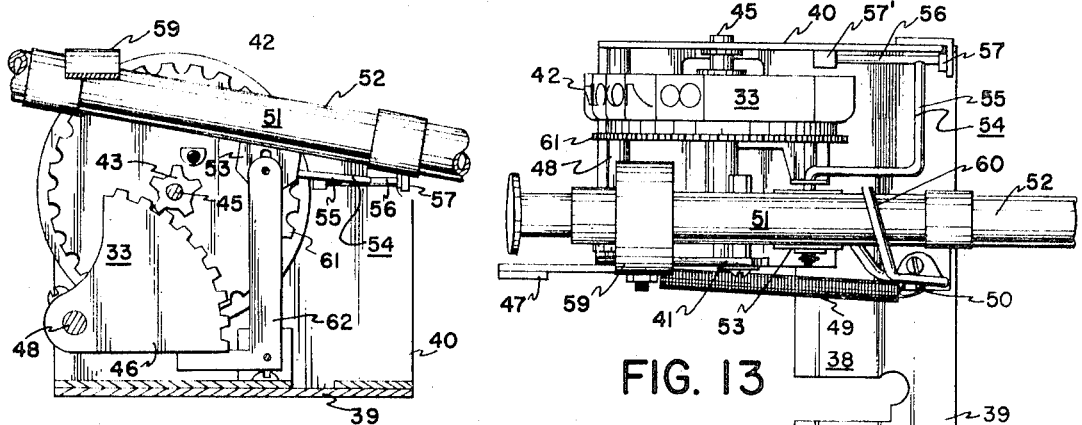
FIG. 12
FIG. 13
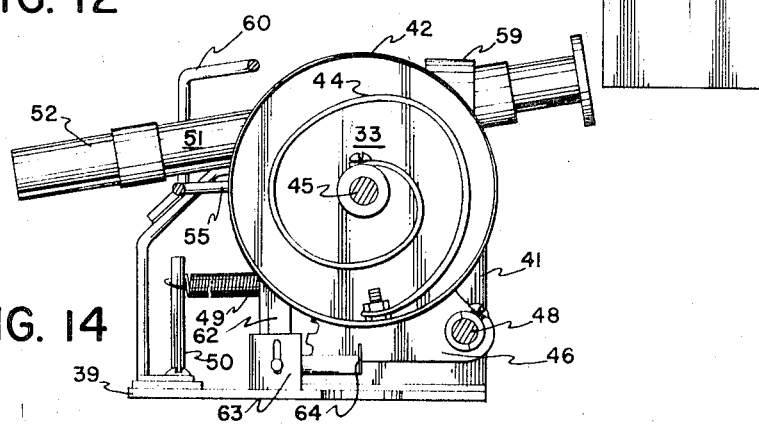
FIG. 14
JULIAN J. MERCIER INVENTOR

SLUMP INDICATOR

FIELD OF INVENTION

The present invention relates to apparatus for determining the slump in concrete and more particularly in apparatus for determining the slump in concrete by weighing the concrete mass at a point in time when the mass has stabilized at its point of natural repose.

DESCRIPTION OF THE PRIOR ART

The workability of concrete in the prior art can generally be predicted by determining the slump of the semiplastic concrete material mass by the commonly known method of placing a quantity of the material into a cone of a given size, rodding the material in the cone a given number of times, removing the cone from the mass and measuring the difference between the height of the cone and the height of the mass when it assumes a position of natural repose, which measurement is called slump. Workability is a word of art used by engineers and craftsmen to characterize the manner in which a given mass of concrete may be finished as well as the predictability of its strength and quality when cured to a solid state.

The method of determining slump heretofor known requires much time to determine, and the characteristics of the mass from which the sample tested is taken tends to change while the test is being made. Changes or corrections made to the mass may not be effective to produce the desired workability.

Accordingly it is an object of the present invention to provide an apparatus for determining slump of semiplastic concrete material substantially instantaneously, and to provide means by which successive determinations of slump may be made substantially continuously.

A further object of this invention is to provide means by which the slump of semiplastic concrete material may be determined during the mixing process in commonly known mechanical mixers.

These and other objects shall become apparent from the description following, it being understood that the method and apparatus here disclosed may be adapted to hand mixing of concrete, fixed concrete mixers and the like with only slight modification by those skilled in the art.

SUMMARY OF INVENTION

Generally, it has been found through extensive tests that semiplastic concrete material having reached a point of stability at its position of natural repose may be weighed, and that weight may be predictably correlated with slump measurements obtained by the commonly known methods of rodding a concrete mass in a cone and measuring the slump. Although different aggregates used in concrete are of different weights concrete admixtures using the same type of aggregates will weigh approximately the same and such like admixtures may be correlated as to workability and slump. Therefore, it is necessary to correlate indicia on the slump indicator apparatus here taught with the slump of materials employing aggregates commonly used in a given geographical area or by a given contractor. That is to say that actual slump and weighed slump indicia may be correlated if a uniform weight of aggregate is used in consecutive batches in a concrete mixer.

The apparatus here taught generally comprises a rectangular sample cage having two opposing vertical upstanding open sides, the cage being mounted on a strain gauge apparatus operable to weigh material by the downward pull of material in the sample cage. It has been found to advantage to provide a lock on the gauge mechanism in order that the slump of material may be determined only when the material has stabilized to a position of natural repose.

A more thorough and comprehensive understanding may be had from the detailed description of the preferred embodiment when read in connection with the drawings forming a part of this specification.

BRIEF DESCRIPTION OF THE DRAWINGS

FIG. 10 is an elevational view of the indicator assembly of this invention as viewed from one of the ends.

FIG. 11 is a side elevational view of the indicator assembly.

FIG. 12 is a cross-sectional elevational view taken substantially along lines 12—12 of FIG. 10.

FIG. 13 is a top plan view of the indicator assembly of this invention.

FIG. 14 is a cross-sectional elevational view of the indicator assembly taken substantially along the lines 14—14 of the FIG. 10.

DESCRIPTION OF THE PREFERRED EMBODIMENT

Figure 1:
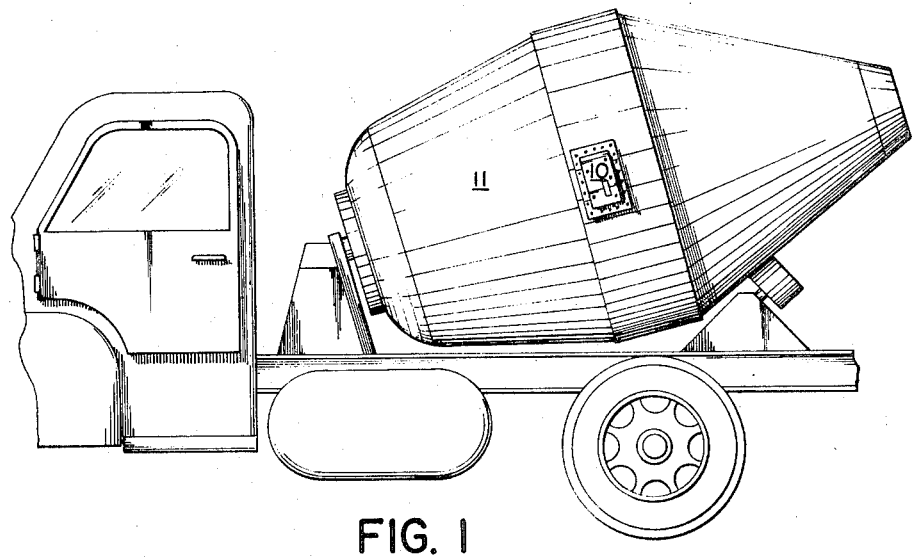
FIG. 1 is a side elevational view of the slump indicator assembly of this invention mounted in a mixing drum of a commonly known transit mixer.

Referring now to the drawings and more particularly to the FIG. 1 which shows to advantage the slump indicator assembly of the present invention generally identified by the numeral 10 located in a commonly known transit mixer 11. While the slump indicator assembly of this invention is described in the environment of a transit mixer it should be understood that the slump indicator assembly 10 may be suitably mounted in any of a variety of commonly known mechanical mixing drums.

The slump indicator 10 is shown to advantage in the fragmentary cross sectional elevational view at its measuring position at the uppermost portion in the mixer 11, as well as for illustrative purposes in a further position as the drum 11 rotates to cause mixing of semiplastic concrete material contained therein. Suffice it to say here, the slump indicator assembly 10 is caused to rotate with the mixer 11, and to pick up a sample of semiplastic concrete material in the drum as the slump indicator assembly 10 is caused to be pulled through the mass as hereinafter later more fully disclosed.

Figure 2:
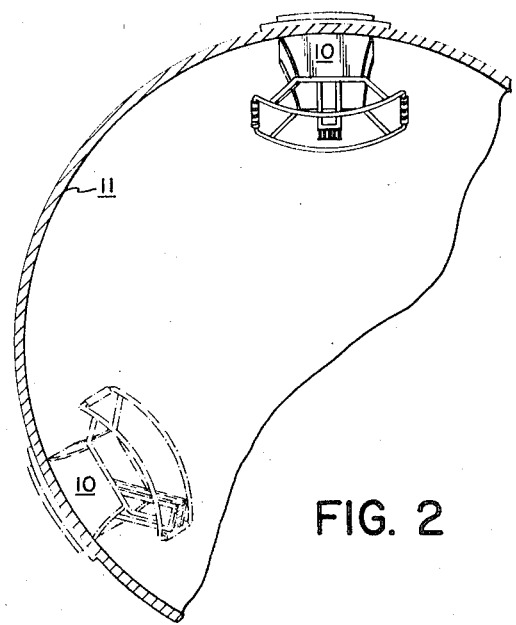
FIG. 2 is a fragmentary cross-sectional elevational view of a mixer drum showing the slump indicator assembly of this invention at its slump-determining position in the uppermost portion of the drum and a slump indicator assembly shown in dotted lines for illustrative purposes in a further position in the drum as it is caused to rotate.
Figure 3:
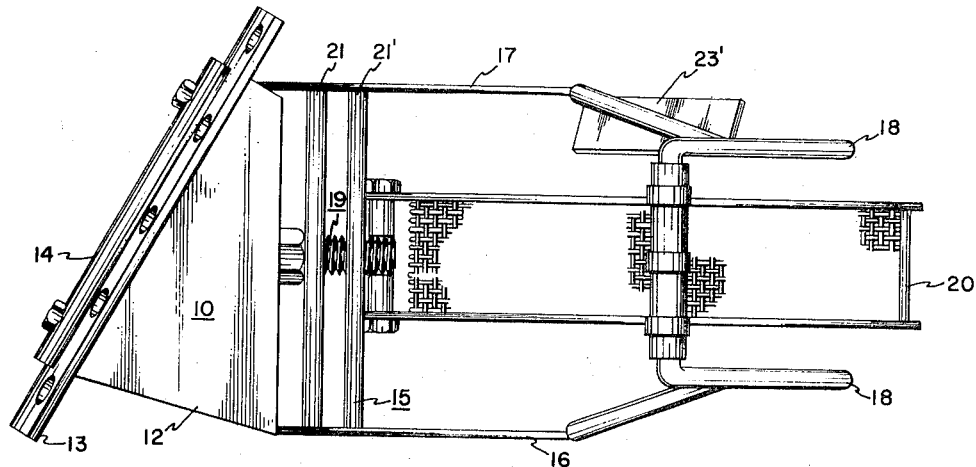
FIG. 3 is a bottom plan view drawn to a larger scale of the slump indicator.
Figure 4:
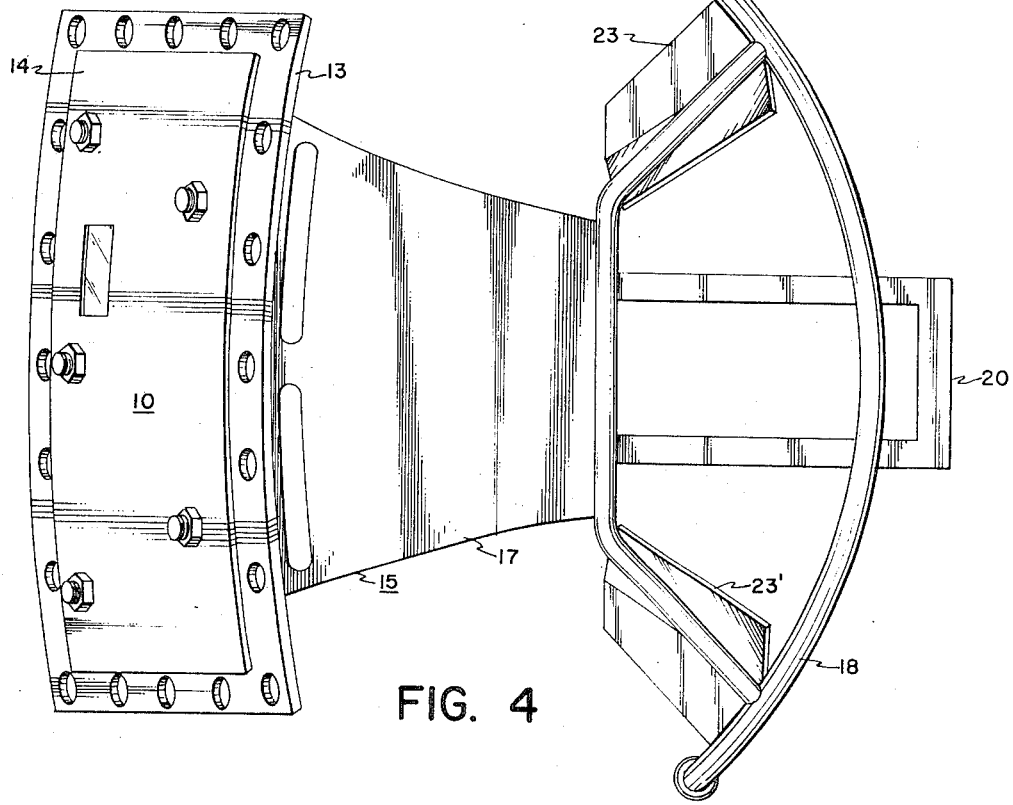
FIG. 4 is a side elevational view of the slump indicator of this invention.

Referring now to the bottom plan view of the FIG. 3 and the side elevational view of the FIG. 4, drawn to a larger scale, a more detailed understanding may be had of the slump indicator assembly 10 where numerals identifying the various components and assemblies are identically the same in both of the drawings. Generally the slump indicator assembly 10 comprises a boxlike housing 12 including a mounting frame 13, and an access cover 14, a deflector framework 15 having a pair of opposing sidewalls 16, and 17, and an arcuate rapper frame 18, an indicator assembly 19, and a semiplastic concrete material sample cage 20 hingedly mounted to the indicator assembly 19 and disposed between the sidewalls 16 and 17 and in the rapper frame 18. Two pairs of bars 21, 21', 22 and 22' are disposed between the sidewalls 16 and 17 on opposite sides of the indicator assembly 19 near the housing 12. It has been found in practice that the bars 21, 21', 22 and 22' tend to deflect semiplastic concrete material away from the indicator assembly 19 and thereby prevent accumulation of material around the assembly 19 which would otherwise cause a false slump determination by the assembly 19. The slump indicator assembly 10 is mounted in a mixer drum substantially in the position shown in FIG. 4 with the slump indicator assembly 10 being carried by the drum with its direction of travel with respect to the semiplastic material in the drum being substantially as that shown in FIG. 3. That is to say, the slump indicator assembly 10 addresses the semiplastic material mass as shown in FIG. 3. In its position to measure the slump of the mass, the slump indicator assembly 10 is located at the uppermost position in the drum as shown in FIG. 2. The sample cage 20 may at that position be best described as a rectangular boxlike cage having two open upstanding sides, the open sides being positioned in the drum transversely with respect to the direction of travel of the drum. As the drum rotates the sample cage 20 is caused to pivotally move and impinge the rapping frame 18. In this manner a sample of semiplastic material in the cage 20 is caused to be knocked out of the cage to be replaced by a new material sample as the slump indicator assembly 10 passes through the semiplastic material mass generally in the bottom portion of the drum. In practice it has been found to advantage to provide a pair of diagonally opposing deflectors 23 and 23' on the rapper frame 18 to overcome twisting of the cage 20 by the semiplastic material mass as the cage 20 is moved through the mass.

Figure 5:
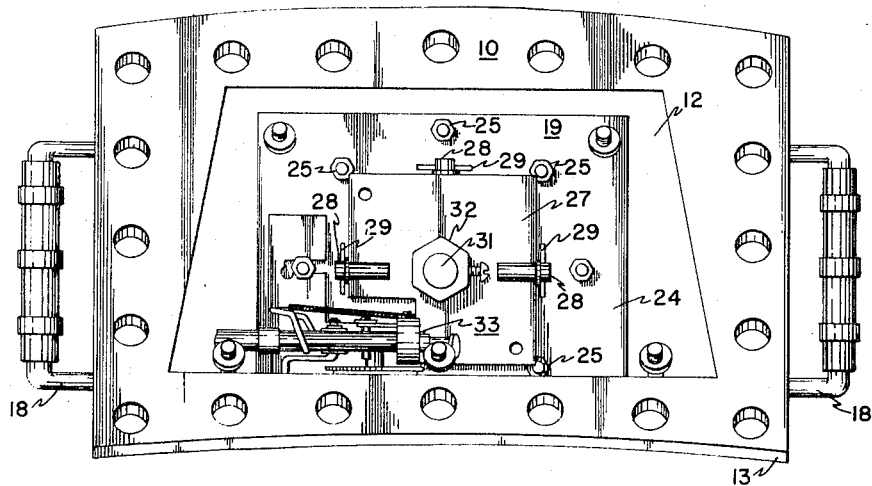
FIG. 5 is a plan view of the indicator housing of this invention with the access cover removed.
Figure 6:
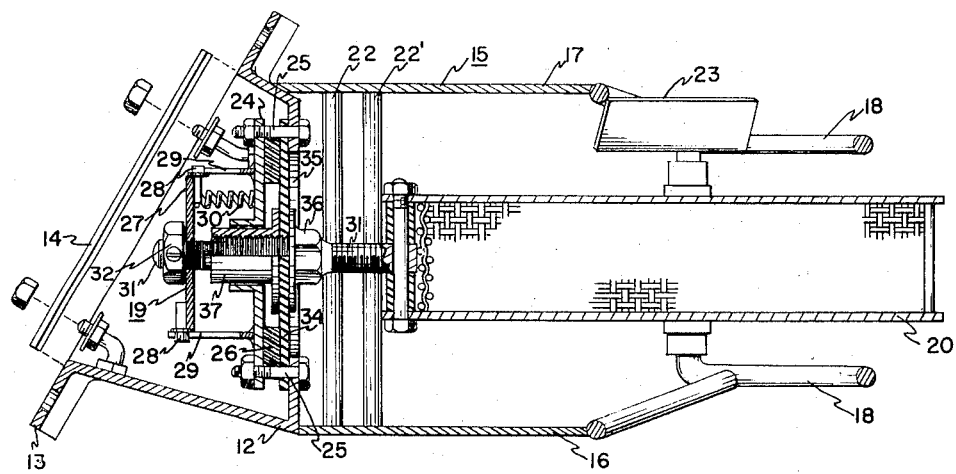
FIG. 6 is a cross-sectional plan view of this invention.
Figure 7:
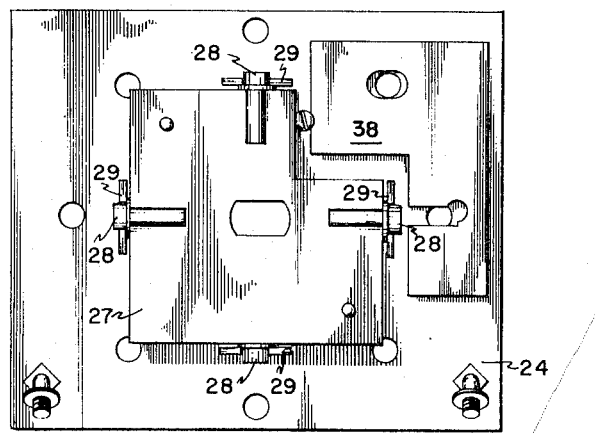
FIG. 7 is a top plan view showing the tension plate of the present invention mounted in yokes on the base mounting plate.
Figure 8:
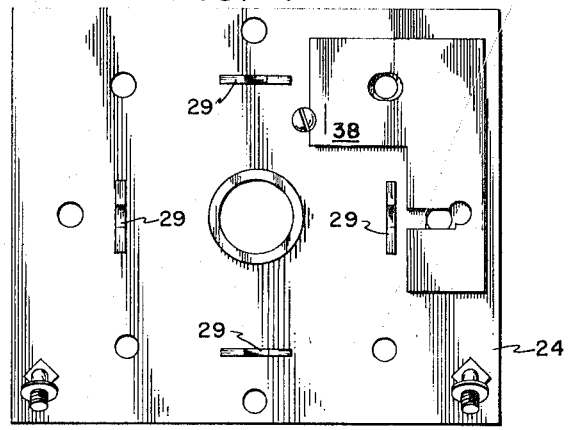
FIG. 8 is a top plan view of the base mounting plate.
Figure 9:
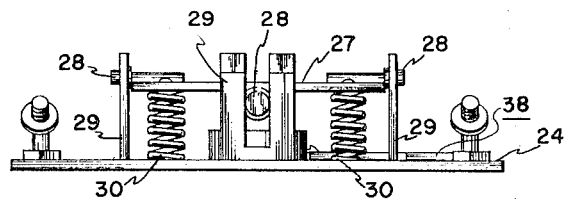
FIG. 9 is a side elevational view of the tension plate mounted in yokes on the mounting base.

The top plan view of the housing 12 with the cover 14 removed of the FIG. 5 and the cross-sectional plan view of FIG. 6 advantageously shown the relationship of the various components and assemblies of the invention and particularly the manner in which the indicator assembly is mounted in the housing 12. The indicator assembly 19 generally comprises a mounting base 24 suitably fastened to the bottom wall of the housing 12 by mounting bolts 25, the mounting base 24 being spaced apart from the bottom wall by a washerlike spacer 26 having a hole centrally disposed therein, a tension plate 27 including a multiplicity of roller support wheels 28 suitably mounted at the terminal sides of the tension plate 27 being engageable with a multiplicity of substantially U-shaped guide yokes 29 suitably fastened to the base 24 coincident with the wheels 28 of the plate 27, the tension plate 27 being carried by a plurality of compressible springs 30 disposed between the base 24 and the plate 27, a shaft 31 carried by the plate 27 by a nut 32 threaded to the shaft 31 at one of its terminal ends, the shaft 31 extending through the housing 12 and being provided with means at its opposite terminal end operable to carry the sample cage 20, and an indicator 33 mounted on the base 24 operable to indicate the slump of the semiplastic concrete mass in the drum in response to movement of the shaft 31. A flexible diaphragm 34 is provided between the washerlike spacer 26 and the lowermost bottom wall of the housing 12 over a shaft entranceway 35 provided in the wall of the housing. The diaphragm 34 is provided with a hole (not shown) centrally disposed therein through which the shaft 31 may pass. A pair of bushings 36 and 37 are threadably mounted on the shaft 31 on opposite sides of the diaphragm 34 and are operable to mount the diaphragm 34 to the shaft 31. In this manner semiplastic concrete material in the drum is prevented from entering the housing 12 and the diaphragm 34 tends to be self cleaning as the shaft 31 is caused to be moved upwardly and downwardly in response to the weight of semiplastic concrete material in the sample cage 20. FIG. 7 shows the tension plate 27 disposed on the mounting base 24 while the FIG. 8 shows the mounting base 24 with the tension plate 27 removed. A side elevational view of the tension plate 27 and the base 24 is shown to advantage in the FIG. 9. Elements and components of the assembly are identically numbered in each of these drawings.

Referring now to the FIGS. 10, 11, 12, 13, and 14, the indicator 33 is shown in detail drawn to a larger scale. The indicator 33 includes a mounting framework 38 having a pedestal portion 39 suitably mounted to the base 24 and a pair of upstanding support portions 40 and 41 spaced apart on the pedestal portion 39. An indicator dial 42 having a driven gear 43 and a normalizing spring 44 is mounted on a shaft 45 journaled for rotation in the support portions 40 and 41. The normalizing spring 44 is suitably connected to the dial 42 and the shaft 45 and is operable to drive the dial 42 to its normal at rest position. A driving gear 46 and an operating arm 47 in engagement with the tension plate 27 are suitably fastened to an axle 48 journaled for rotation in the support portions 40 and 41. The driving gear 46 is in engagement with the dial driven gear 43 and is operable to cause rotation of the dial 42 and the gear 43 in response to movement of the tension plate 27 and the operating arm 47. The operating arm 47 is provided with a spring 49 having one of its terminal ends suitably fastened to the arm 47 and its opposite terminal end fastened to a post 50 carried by the frame assembly 38. The spring 49 is operable to return the operating arm 47 to its normal position in response to the upward movement of the tension plate 27 as hereinafter later described.

The indicator 33 is normally held in a locked position by the lock assembly 51. The lock assembly 51 includes a viallike container 52 having a liquid material such as mercury contained therein. The vial 52 is provided with a mounting bracket 53 disposed rearward of the midpoint balance of the vial. The vial 52 is carried by a pivotally mounted axle assembly 54 including an L-shaped pivotal arm 55 suitably fastened to a bar 56 rotatably mounted between a pair of blocks 57 and 57' suitably fastened to the upstanding wall 40 of the indicator frame 38. The mounting bracket 53 is operable to pivotally and axially carry the vial 52 on the pivotal arm 55. The vial 52 may rotate on the pivotal arm 55 in response to movement of fluid in the vial 52. A vial stop arm 59 is suitably mounted to the wall 41 to stop the upward travel of the forwardmost portion of the vial 52 while a stop bracket 60 suitably mounted to the base 39 is operable to stop the upward travel of the opposite rearwardmost portion of the vial 52 in its rotation on the pivotal arm 55. As the indicator 33 is caused to move in response to movement of the mixer drum, liquid in the vial 52 is caused to move from one end of the vial 52 to the opposite end and thereby cause rotation of the vial 52 on the pivotal arm 55 until the indicator 33 is inverted in the drum at which time the vial 52 pivots upwardly on the arm 55 which is caused to pivot upwardly as the bar 56 is caused to rotate. The dial 42 is provided with a gear 61. A substantially L-shaped locking bracket 62 is suitably fastened at one of its terminal ends to the pivotal arm 55 and slidably carried at its lowermost end in a slotted bracket 63 mounted on the base 39. The L-shaped locking bracket 62 is provided with a foot 64 engageable with the gear 61. In all positions other than the upstanding position shown in the drawings the foot 64 is caused to be in engagement with the gear 61 and the dial 42 is restrained from movement.

In operation the slump indicator assembly 10 is carried by the mixer drum of a mixer as it rotates. The walls of the sample cage 20 are coincident with the direction of travel of the drum so that the semiplastic concrete in the drum is caused to flow into the cage 20 from the open opposing sides transverse to the direction of travel of the drum. In this manner the sample cage 20 tends to pick up the semiplastic material of the mixed mass in the lower portion of the drum rather than material carried about the drum in the process of being mixed. Hence a more accurate sample of the mass is obtained. As the mixer drum rotates the sample cage 20 is caused to strike either of the rapper bars 18 to dislodge semiplastic material from the cage 20. When the slump indicator assembly 10 in the mixing drum is at the uppermost portion of the drum the vial 52 causes the pivotal arm 55 to move downwardly by the weight of the vial 52 and consequently causes the foot 64 to disengage the gear 61 to permit rotation of the indicator dial 42. The indicator dial 42 is caused to rotate in response to the downward movement of the operating arm 47. As the mixer drum is caused to rotate beyond the point where the slump indicator assembly 10 is at the uppermost position of the drum, the vial 52 rotates on the pivotal arm 55 which is moved upwardly to cause the foot 64 to engage the gear 61 and thereby lock the dial 42 into position. Therefore, the indicator dial 42 is caused to remain at the position at which it was turned at the time the mass of semiplastic material in the cage 20 caused the downward movement on the operating arm 47. Hence, indicia on the indicator dial 42 may be read at any position as the drum rotates except at its uppermost point when the sample is tested.

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

I claim:

1. In a slump indicator the combination of a housing operable to be mounted in a commonly known rotary concrete mixer, a framework depending from said housing, said framework including a pair of opposing sidewalls, a pair of rapper bars disposed between said sidewalls, a strain gauge indicator assembly mounted in said housing, said strain gauge indicator assembly comprising a mounting base suitably fastened to the wall of said housing lowermost with respect to the peripheral wall of said rotary concrete mixer, said base including a multiplicity of upstanding yokes, a tension plate, said tension plate including a multiplicity of guide rollers mounted on said plate coincident with said yokes, said rollers being operable to slidably move in said yokes, a compressible spring disposed between said base and said plate, an upstanding shaft mounted at one of its terminal ends on said plate and extending through said lowermost wall of said housing, said shaft having a sample cage hingedly carried at the opposite terminal end thereof, said cage being disposed between said depending sidewalls of said framework, and being operable to pivotally move between said sidewalls in direction coincident with the rotation of said concrete mixer, said sample cage having two opposing open sides adjacent respective sidewalls of said framework, said cage being operable to impinge said rapper bars in response to rotational movement of said concrete mixer, an indicator assembly mounted on said base and having an arm engageable with said tension plate, said indicator assembly including a latching means engageable with said indicator assembly being operable to normally lock said indicator means, means on said indicator assembly being operable to disengage said latching means at a predetermined position in the rotational travel of said concrete mixer, said indicator assembly being operable to move in response to movement of said shaft and said tension plate when unlatched.

2. The apparatus of claim 1 in which said latching means comprises a cylindrical viallike container including liquid therein, said container including mounting means distally disposed rearward of the center balance point of said container, said container being substantially horizontally disposed with respect to said lowermost wall of said housing, an upstanding mounting bracket mounted on said base, said bracket including a slot, a substantially L-shaped arm including a footlike portion engageable with said indicator assembly being operable to normally lock said assembly, said arm including a pin carried in said slot of said upstanding bracket, said container and said arm being axially mounted on a shaft, said shaft being carried by an axle journaled for rotation in said indicator assembly, said container being operable to axially move on said shaft in response to movement of fluid in said container in response to rotational movement of said concrete mixer, and to move upwardly and downwardly with said shaft in response to rotational movement of said axle, said L-shaped arm including said foot being operable to move upwardly and downwardly in response to movement of said container.

3. The apparatus of claim 1 including a plurality of deflector plates carried by said rapper bars, said deflector plates being operable to deflect semiplastic concrete material away from said sample cage.

* * * * *